United States Patent [19]

Kosik et al.

[11] Patent Number: 5,782,710
[45] Date of Patent: Jul. 21, 1998

[54] AUTOMATIC CLUTCH CONTROL

[75] Inventors: Franz Kosik, Ostfildem; Günter Wörner, Kernen, both of Germany

[73] Assignee: Mercedes-Benz AG, Stuttgart, Germany

[21] Appl. No.: 699,664

[22] Filed: Aug. 19, 1996

[30] Foreign Application Priority Data

Aug. 21, 1995 [DE] Germany .......................... 195 30 610.4

[51] Int. Cl.$^6$ .................................................. B60K 23/02
[52] U.S. Cl. ......................... 477/86; 477/174; 477/175; 701/67
[58] Field of Search ........................... 477/86, 87, 88, 477/61, 62, 174, 175, 179, 180; 364/424.096, 424.097

[56] References Cited

U.S. PATENT DOCUMENTS

| 4,577,737 | 3/1986 | Niikura et al. ............... 477/174 X |
| 4,624,349 | 11/1986 | Watanabe ................... 477/175 X |
| 4,667,787 | 5/1987 | Hofman ....................... 477/175 |
| 4,905,801 | 3/1990 | Tezuka ..................... 364/424.096 X |
| 5,002,170 | 3/1991 | Parsons et al. ............... 477/174 X |
| 5,099,969 | 3/1992 | Ohtake .......................... 477/86 |
| 5,322,150 | 6/1994 | Schmist-Brucken et al. ..... 477/175 X |
| 5,439,428 | 8/1995 | Slicker ......................... 477/86 X |

FOREIGN PATENT DOCUMENTS

| 28 33 961 | 2/1980 | Germany . |
| 39 22 315 | 1/1991 | Germany . |
| 30 39 091 | 5/1991 | Germany . |
| 3-536 | 1/1991 | Japan ........................... 477/86 |
| 88007457 | 10/1988 | WIPO ........................... 477/86 |

*Primary Examiner*—Khoi Q. Ta
*Attorney, Agent, or Firm*—Klaus J. Bach

[57] ABSTRACT

In a method of controlling an automatic clutch disposed between a motor, especially an internal combustion engine, and the drive train of a vehicle which includes an arbitrarily operable transmission, the clutch is engaged in dependence on the torque generated by the motor in such a manner that the torque which can be transmitted by the clutch is only slightly above the motor-generated torque and, immediately after a transmission ratio change, the clutch is first fully engaged for the transmission of maximum torque if the motor torque exceeds a certain threshold value.

4 Claims, 2 Drawing Sheets

AUTOMATIC CLUTCH CONTROL

BACKGROUND OF THE INVENTION

The invention relates to a method of controlling an automatic clutch which is disposed between the motor, particularly an internal combustion engine, and the drive train of a vehicle with a transmission whose gears can be arbitrarily changed by an operator wherein the clutch is controlled dependent on the engine torque in such a way that the torque the transmission is capable of transmitting is always only slightly above the torque provided by the motor.

Motor vehicles driven by internal combustion engines via manual transmissions and automatic clutches are generally known and are produced in series.

The clutch which automatically interrupts power transmission between the engine and the drive wheels usually operates comfortably by disengaging and re-engaging in a relatively smooth way.

DE 30 39 091 A1 discloses an automatic clutch control arrangement wherein the clutch is controlled so as to be capable of transmitting, during vehicle operation, a torque which depends on the available engine torque in such a way that, below a lower threshold value of the engine torque, the clutch transmits only a predetermined constant torque. If the available engine torque is above the predetermined threshold value, the clutch is set to be able to transmit full design torque.

DE 28 33 961 discloses an automatic vehicle clutch wherein, after shifting, the disengaged clutch is re-engaged in a controlled manner such that a difference in rotational speed of the clutch input and output shafts is reduced with a time gradient whose value increases with increasing actuation of an operating pedal for controlling engine power output. With such an arrangement, the clutch can be engaged in a relatively uniform manner.

DE 39 22 315 A1 discloses a control arrangement for an automatic clutch for a vehicle wherein the clutch is operated dependent on the torque available from the engine and the torque desired for operating the vehicle.

It is the object of the present invention to provide a simple control for an automatic clutch of a vehicle wherein the clutch is controlled dependent on engine torque such that the clutch is capable of transmitting at least, but not much more of, the torque which is provided by the engine.

SUMMARY OF THE INVENTION

In a method of controlling an automatic clutch disposed between a motor, especially an internal combustion engine, and the drive train of a vehicle which includes an arbitrarily operable transmission, the clutch is engaged in dependence on the torque generated by the motor in such a manner that the torque which can be transmitted by the clutch is only slightly above the motor-generated torque and, immediately after a transmission ratio change, the clutch is first fully engaged for the transmission of maximum torque if the motor torque exceeds a certain threshold value.

The invention is based on the general idea to improve the driving comfort by controlling the clutch in such a way that the torque which can be transmitted through the clutch is normally only slightly greater than the torque which is generated by the engine, that is in most operating phases, the clutch is not fully released. As a result, disengagement of the clutch as it is necessary for changing the transmission ratio can be done quite rapidly. Furthermore, jerks in the drive drain can be accommodated by slippage of the clutch so that they are not transmitted to the engine and are not felt by the driver or the occupants of the vehicle. On the other hand, undesirable slippage which may occur with strong acceleration of the vehicle and correspondingly fast transmission ratio changes and which would result in relatively high clutch wear is avoided with the arrangement according to the invention. Such slipping is eliminated by controlling the clutch such that, after a transmission ratio change when the engine torque increases beyond a certain small threshold value, the clutch is first fully released, that is it is fully engaged for the transmission of a maximum torque to insure that all slippage is eliminated. In this way, the clutch is engaged in the same way in which a driver utilizing high engine power for rapid acceleration would control a manual clutch.

By subsequently controlling the clutch so as to provide for the torque transmission in dependence on the engine torque or a corresponding value, the clutch can be rapidly disengaged for a subsequent gear change.

The invention will be described in greater detail below on the basis of the accompanying drawing.

DESCRIPTION OF PREFERRED EMBODIMENTS

Figure 1:
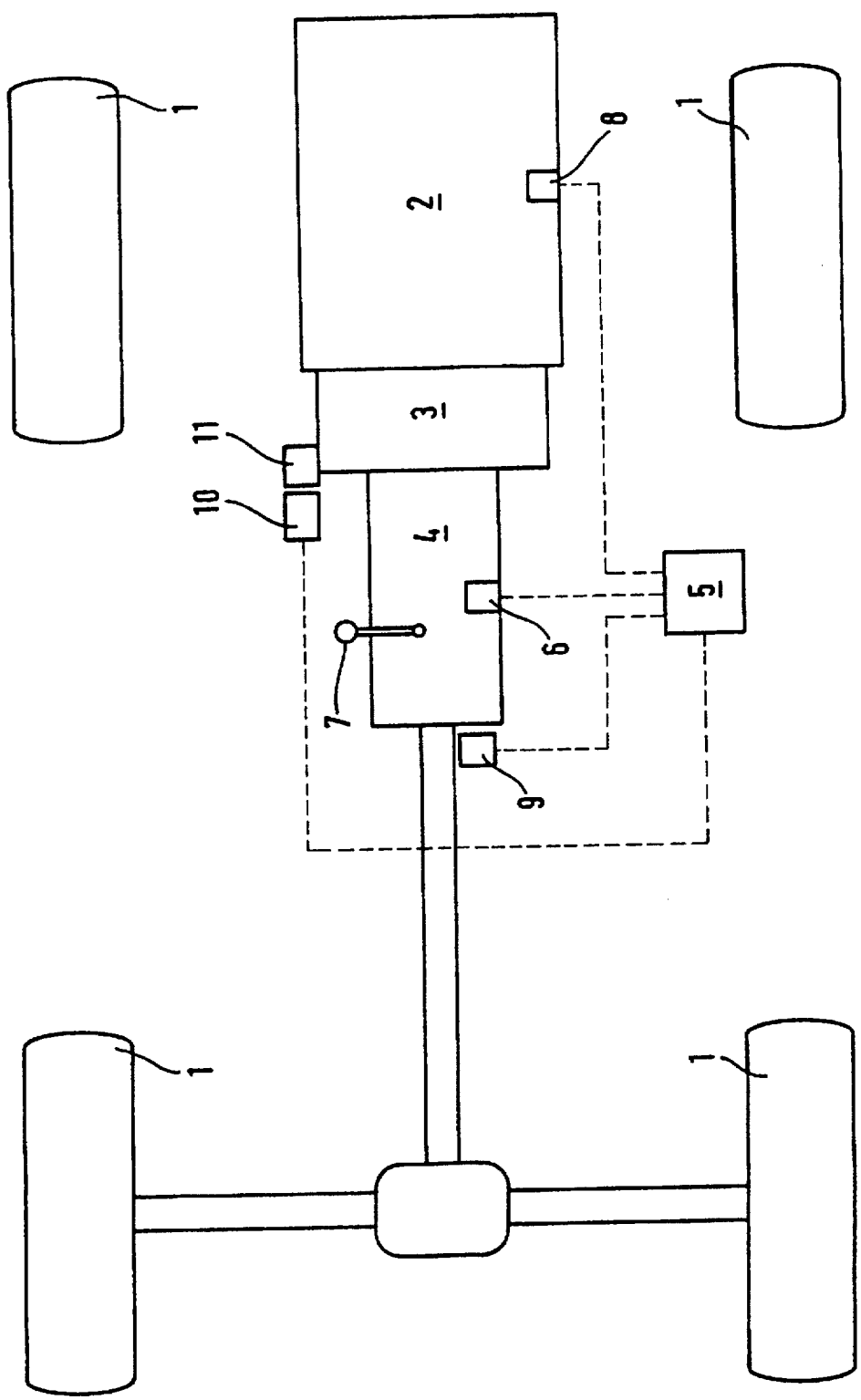
FIG. 1 is a schematic representation of a vehicle with a manual transmission and an automatic clutch which is controlled in accordance with the invention.

Of the vehicle, only the wheels 1, the engine 2, the automatic clutch 3 and the manually operated transmission 4 are shown in the figure wherein the rear wheels 1 are driven by the engine 2 by way of the automatic clutch 3 and the manually operated transmission 4.

For controlling the automatic clutch 3 an electronic control unit 5 is provided which is connected to a gear shift sensor unit 6, of the transmission 4. The sensor unit 6 generates a signal whenever a gear shift lever 7 is operated for a transmission ratio change of the transmission and the signal is transmitted to the control unit 5. The control unit 5 is further connected to a sensor 8 which generates a signal representative of the engine torque which signal is also supplied to the control unit 5. The sensor 8 may for example sense the position of the engine throttle valve and/or the position of a pedal for controlling the power output of the engine.

Also other sensors may be provided for supplying signals to the control unit 5 for example a sensor 9 sensing vehicle speed.

The control unit 5 is connected to a preferably electrical actuator 10 which operates the clutch 3 by way of a self-locking transmission 11, for example a worm gear.

During normal vehicle operation, the automatic clutch 3 is controlled by the control unit 5, by appropriate operation of the actuator 10, in such a way that the torque which can be transmitted by the clutch 3 (clutch torque) is only slightly greater than the torque generated by the engine 2. This may be achieved for example by controlling the degree of engagement of the clutch 3 dependent of the position of the throttle valve of the engine 2, that is, dependent on signals supplied by the sensor 8. Consequently, the actuating mechanism for the clutch 3 is in an intermediate position between its opposite end positions in which the clutch is fully disengaged or fully engaged, respectively.

Figure 2:
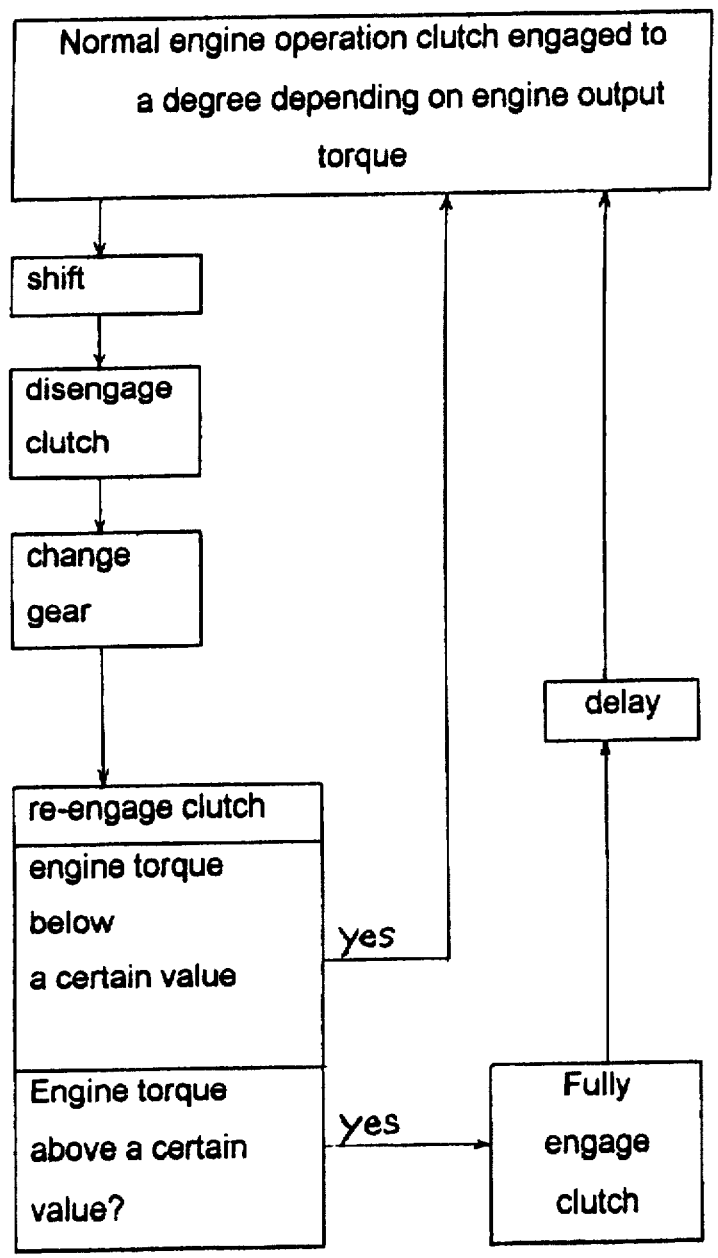
FIG. 2 is a flow chart showing the clutch control method according to the invention.

When the shift lever 7 for changing the transmission ratio of the transmission 4 is operated, the fully disengaged position of the clutch 3 can then be achieved quite rapidly (FIG. 2).

If, after the transmission ratio has been changed, that is, the driver has shifted into another gear and/or the vehicle speed exceeds a relatively low threshold value, that is if the signals from the sensors 8 or 9 indicate a relatively large engine torque, the automatic clutch 3 is first (rapidly) fully engaged. After a certain delay the clutch engagement is then again controlled in dependence on the torque generated by the engine.

In this manner, it is insured that the automatic clutch 3 is operated with relatively little slippage during gear shifts in phases of relatively high acceleration.

However, if the torque generated by the engine after a gear shift is only small because the driver does not step on the gas pedal and the throttle valve remains therefore essentially closed, the clutch is controlled from the start in dependence on the engine torque in order to achieve a smooth engagement of the clutch as it is desirable during such operating phases with regard to a high vehicle operating comfort.

What is claimed is:

1. A method of controlling an automatic clutch disposed between a motor and a drive train of a vehicle which includes a transmission, said method comprising the steps of: engaging said clutch during operation of said vehicle in dependence on the torque generated by said motor such that a torque which can be transmitted by said clutch is higher, by a predetermined amount, than the torque generated by said motor, and, immediately after a gear change of said transmission, first fully engaging said clutch for the transmission of maximum torque if the motor torque as represented by a torque value exceeds a certain threshold value.

2. A method according to claim 1, wherein said clutch is engaged to a degree dependent on the torque generated by said motor if, after a gear change, the torque generated by said motor remains below a predetermined value.

3. A method according to claim 1, wherein, with increasing vehicle speed, said clutch is engaged so as to be able to transmit an increasing torque.

4. A method according to claim 1, wherein said clutch is engaged to a degree dependent on the torque generated by said motor if, after a gear change, the torque generated by said motor is increased only at a rate less than a predetermined value.

* * * * *